Figure 1:
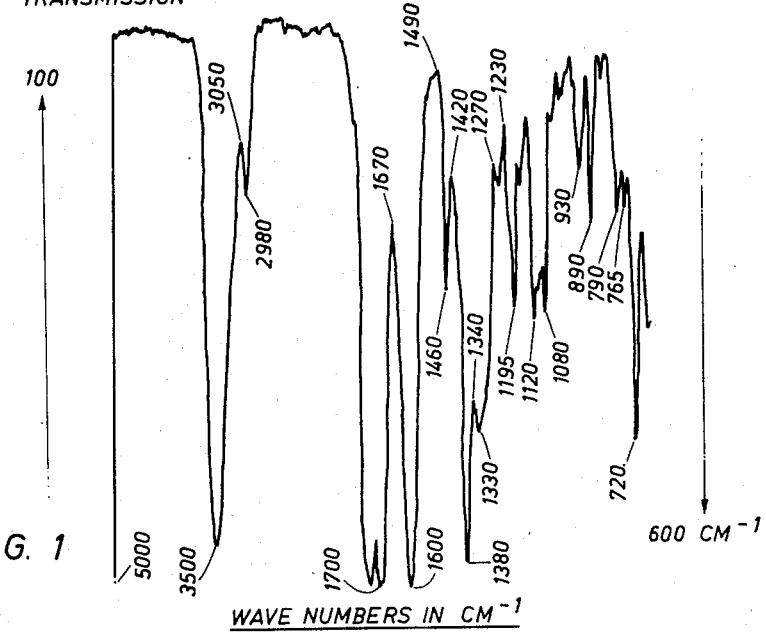

United States Patent Office 3,213,102
Patented Oct. 19, 1965

3,213,102
6-IMIDOPENICILLANIC ACIDS
Anthony L. Tosoni, 395 Parkside Drive, and Alfonsas Zubrys, 1577 Bloor St. W., both of Toronto, Ontario, Canada
Filed Oct. 19, 1961, Ser. No. 146,120
3 Claims. (Cl. 260—301)

This invention relates to new antibiotic substances and the production thereof.

More particularly, the invention is concerned with new antibiotics and the production thereof, some of which antibiotics are active against various organisms and especially against many penicillin-G-resistant staphylococcal strains.

Another important aspect of some of the new antibiotics which we have prepared and which exhibit the above activity is their high degree of stability to acid and their high degree of stability to the enzyme penicillinase.

According to our invention these new antibiotic substances which exhibit a high degree of activity against such organisms as penicillin-G-resistant staphylococcal strains and exhibit the above-described stability comprise new derivatives of 6-aminopenicillanic acid, namely 6-imidopenicillanic acids. To our surprise, we have discovered that 6-aminopenicillanic acid can be made to react with carboalkoxyimides to produce 6-imidopenicillanic acids. Some of the new antibiotic derivatives of 6-aminopenicillanic acid which we have produced following our discovery of the above reaction have been of special interest. Among these is potassium 6-phthalimido-penicillanate and 6(4-nitrophthalimido) penicillanic acid (sodium salt). These latter preparations have been found to have a particularly high degree of activity against staphylococcal infection as well as a high degree of acid and penicillinase stability. Other preparations or derivatives which have also been found to be effective antibiotics are given in the specific examples set out below.

The inestimable benefits that have followed from the discovery of penicillin are of course well-known. Various forms of penicillin are now known, the one most frequently used being penicillin-G. In addition to various other forms of penicillin there are also various other antibiotics. The discovery and production of the several forms of penicillin, and indeed other antibiotics, has been of importance because some of these pencillins or antibiotics are active against organisms which are able to survive large concentrations of other antibiotics. Of special significance therefore is the fact that many of the new antibiotics which we have discovered according to the present invention are active against various organisms, for example, against many penicillin-G-resistant staphylococcal strains.

The importance of our invention will be appreciated when it is realized that the problem of infection by resistant strains, for example strains of staphylococcus, is one of great concern to many hospitals. Although inestimable benefits have followed from the introduction and use of penicillin-G, the literature shows that serious difficulties have been experienced by staphylococcal infection especially in hospitals. It is therefore of significant importance that the products of our invention will be of great assistance in controlling many of these infections.

Figure 2:
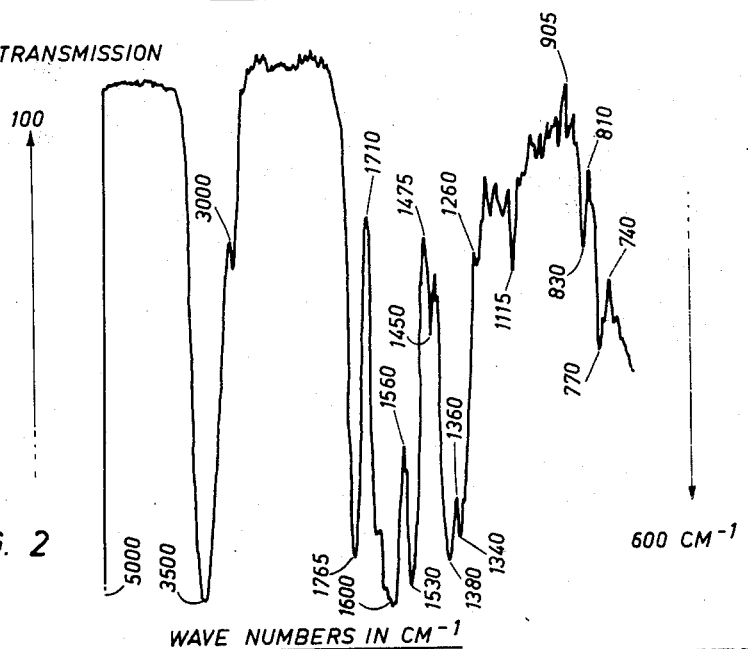

With reference to the drawings, FIGURE 1 is a graph showing the infra-red spectrum of one of our new antibiotics, namely 6-phthalimido-penicillanic acid (potassium salt) and FIGURE 2 is a graph showing the infra-red spectrum of another of our new antibiotics namely, sodium 6-(3-nitrophthalimido) penicillanate.

According to our invention we have found that 6-aminopenicillanic acid can be made to react with carboalkoxyimides to produce 6-imidopenicillanic acids according to the following general formula.

EQUATION I

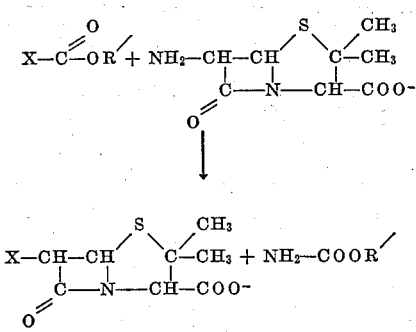

where X is an imido group.

Therefore, the new antibiotics according to our invention can be represented by the general formula.

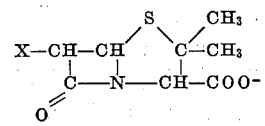

To proceed according to Equation I for the preparation of new derivatives of 6-aminopenicillanic acid we start with 6-aminopenicillanic acid or any convenient salt thereof in aqueous solution. To this solution we add slowly one or more carboalkoxyimides either as a powder, a solution or a suspension. The reaction mixture is stirred throughout, usually at room temperature, and the acidity is maintained close to neutrality or, preferably, slightly on the alkaline side thereof. At the conclusion of the reaction the mixture is filtered to remove undissolved material. The filtrate may be extracted with a suitable solvent to remove dissolved unreacted carboalkoxyimide. The new derivative may be recovered by any suitable means, such as freeze-drying, extraction or precipitation or combination thereof.

EXAMPLE 1

A specific example detailing the production of 6-phthalimido-penicillanic acid (potassium salt) that is potassium 6-phthalimidopenicillanate as represented by the following Equation II is detailed below.

EQUATION II

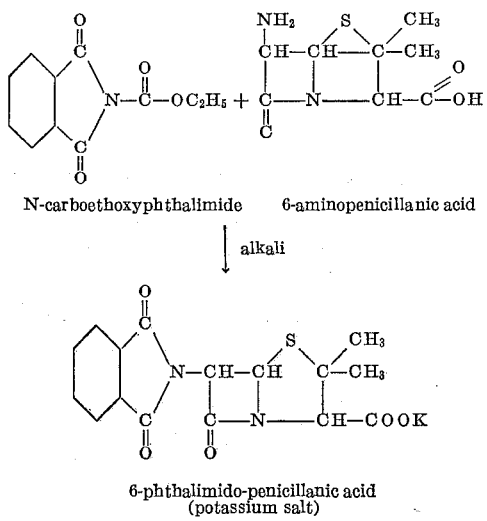

N-carboethoxyphthalimide    6-aminopenicillanic acid

↓ alkali 6-phthalimido-penicillanic acid
(potassium salt)

In proceeding according to Equation II, 15 grams of potassium acetate were dissolved in 15 cc. of water. To this solution we added 1.08 grams of 6-aminopenicillanic acid and stirred well. We then added 1.2 grams of N-carboethoxyphthalimide. The mixture was stirred at room temperature for three hours. The solution was diluted to 50 cc., filtered and extracted twice with ethyl acetate, using about 50 cc. of ethyl acetate each time. The extract was discarded. To the aqueous solution another quantity of 150 cc. of ethyl acetate was added and the mixture acidified to pH 2 by the addition of 10% phosphoric acid with vigorous stirring. This extraction with ethyl acetate was repeated twice giving a total volume of extract of about 300 cc. The extract was then dried by treatment with sodium sulphate and neutralized to pH 6.9 by the addition of about 150 cc. of 0.5 normal potassium bicarbonate solution. The aqueous solution was then separated and freeze-dried yielding 9.37 grams of dried substance which contained a large amount of potassium acetate. This residue was dissolved in 23 cc. of water, filtered, and 12.5 cc. of saturated potassium acetate solution were added. This resulted in the precipitation of the new derivative of 6-aminopenicillanic acid (as the potassium salt) in crystalline form. The crystals were removed by filtration, washed with butanol and isopropanol and ethyl acetate and dried in air to yield 0.84 gram of the potassium salt of 6-phthalimidopenicillanic acid which we have identified as compound 95 in the following reported tests.

Our new product was re-crystallized by dissolving 0.8 gram in 0.9 ml. of water. To this was added 10 ml. of isopropanol. Long needle-like crystals were formed and were removed by filtration, washed with isopropanol and ethyl acetate and dried. The yield of re-crystallized material was 0.5 gram.

$[\alpha]_D^{20°} = +266$; 0.3 percent solution in Sorensen buffer pH 7.4. The M.P. (with decomposition) was 145–150° C. (uncorr.). The infra-red spectrum for this material is shown in FIGURE 1, showing typical lactam and imido bands.

*Stability of compound 95 to acid*

The following tests show that potassium 6-phthalimidopenicillinate or compound 95 is stable to acid. Solution of compound 95 in buffer at pH 2.2 and at a concentration of close to 3 mg./ml. was prepared and the optical rotation of the solution was followed at room temperature. These are the results:

Compound 95:     Rotation in 2 dcm. tubes, degrees
0 time (as close as poss.) _____ +1.58
10 mins. _____ 1.50
20 mins. _____ 1.50
30 mins. _____ 1.48
40 mins. _____ 1.48
50 mins. _____ 1.48
60 mins. _____ 1.48

Thus it is seen that after a small initial fall the rotation remained steady signifying marked stability to acid.

*Stability of compound 95 to B cereus penicillinase*

Solutions of both compound 95 and sodium 2,6 dimethoxyphenylpenicillin (methicillin) at a concentration of 5 mg./ml. in phosphate buffer (pH 6.4) were prepared. Each solution contained equal amounts of B cereus penicillinase. The optical rotation of these solutions at room temperature was followed. Zero time readings were taken on separate samples not containing penicillinase. These are the results:

| Time | Rotation in 2 dcm. tubes (degrees) | |
|---|---|---|
| | Compound 95 | Sodium 2,6 dimethoxyphenyl penicillin |
| 0 | +2.65 | +2.17 |
| 5 | 2.64 | 2.21 |
| 22 | 2.64 | |
| 25 | | 2.12 |
| 58 | | 2.04 |
| 68 | 2.62 | |
| 95 | | 1.92 |
| 114 | 2.56 | |
| 133 | | 1.92 |
| 158 | 2.50 | |

The drop in rotation indicates that compound 95 is more stable to B cereus penicillinase than even 2.6 dimethoxyphenylpenicillin.

*Antibiotic activity of compound 95*

The remarkable resistance of compound 95 to B cereus penicillinase led us to determine its activity against hospital strains of Staphylococcus aureus which were resistant to penicillin G.

These are the results:

| Dilution of 24 hour culture of the organism | Minimum Inhibitory Concentration (m.i.c.), mcg./ml. | | |
|---|---|---|---|
| | Strain | Penicillin G | Compound 95 |
| 1:50 | 1-35 | 4096 | 32 |
| | 1-40 | 4096 | 32 |
| | 1-43 | 4096 | 32 |
| 1:500 | 1-35 | 512 | 16 |
| | 1-40 | 512 | 16 |
| | 1-43 | 512 | 16 |
| 1:5000 | 1-35 | 64 | 16 |
| | 1-40 | 64 | 16 |
| | 1-43 | 64 | 16 |

Thus it is seen that the m.i.c. for compound 95 is very little affected by inoculum size. We have now tested about 25 hospital strains of staphylococcus which were resistant to from 10 to 2000 mcg./ml. of penicillin G (1/500 dilution of organism) and have found that for all these the m.i.c. of compound 95 was between 4 and 16 mcg./ml.

*In vivo activity of compound 95 in mice*

Protective tests were performed in mice inoculated with staphyloccocus strain # 1-37 which was found to kill mice overnight. The results are shown in the following table:

CHEMOTHERAPY OF STAPHYLOCOCCUS INFECTION IN MICE

[Intraperitoneal Inoculation with Penicillin-Resistant Strain 1-37 in 5% Mucine]

| Drug | Dosage,* mg./mouse s.c. | No. of Mice | Deaths | | ED50 | |
|---|---|---|---|---|---|---|
| | | | 24 hrs. | 96 hrs. | Mg./ mouse | Mg./ kg. |
| Compound 95 | 3.2 | 10 | 0/10 | 0 | .18 | 9 |
| | .8 | 10 | 0/10 | 0 | | |
| | .2 | 10 | 8/10 | 8/10 | | |
| | .05 | 10 | 7/10 | 7/10 | | |
| Methicillin | 3.2 | 10 | 0 | 0 | .16 | 8 |
| | .8 | 10 | 0 | 0 | | |
| | .2 | 10 | 3/10 | 3/10 | | |
| | .05 | 10 | 10/10 | 10/10 | | |
| Penicillin G as K-salt | 3.2 | 10 | 5/10 | 5/10 | 2.71 | 135 |
| | .8 | 10 | 7/10 | 7/10 | | |
| | .2 | 10 | 9/10 | 9/10 | | |
| | .05 | 10 | 10/10 | 10/10 | | |
| No Treatment: | | | | | | |
| Culture 1:8 | | 20 | 20/20 | 20/20 | | |
| Culture 1:16 | | 5 | 4/5 | 4/5 | | |
| Culture 1:64 | | 5 | 1/5 | 1/5 | | |
| Culture 1:256 | | 5 | 0 | 0 | | |

* First dose given immediately before, second dose 5 hours after inoculation.

*Toxicity*

Five mice were injected into the tail vein with 0.25 ml. of an aqueous solution of compound 95 containing 2.8 mg. of compound 95 per ml. of solution. No animals had died after 48 hours, showing a remarkable freedom from toxicity.

*Conclusions from tests of compound 95*

From the foregoing tests reported, it will be seen that compound 95 is a non-toxic derivative of 6-aminopenicillanic acid which is highly resistant to penicillinase and to acid. It has good protective action against penicillin-G-resistant staphylococcal infection as exhibited by the tests on mice which is of about the same order of magnitude as that of methicillin.

Because of its acid stability it is effective when given orally.

While we have described in detail the preparation of potassium 6-phthalimidopenicillanate which we have found to be an effective antibiotic substance, we have also prepared other 6-imidopenicillanates which are antibiotic substances having characteristics corresponding to some of those of potassium 6-phthalimidopenicillanate. The preparation of typical examples of such other 6-imidopenicillanates we have produced is given below.

EXAMPLE 2

*Preparation of 6(3-nitrophthalimido) penicillanate*

1.08 grams of 6-aminopenicillanic acid were stirred with 5 cc. of water. The mixture was slowly neutralized by the addition of 4.7 cc. of 1-normal sodium hydroxide solution. We then added slowly with stirring 1.4 grams of N-carboethoxy-3-nitrophthalimide. 1-normal sodium hydroxide solution was added as required to maintain the acidity slightly more alkaline than neutral. A total of 3.2 cc. was required. At the end of about 45 minutes the solution was filtered to remove any undissolved material and was diluted to 50 cc. with water.

The solution was then extracted once with 50 cc. of ethyl acetate. The aqueous layer was then mixed with more ethyl acetate and the acidity adjusted to pH 2 with 10% phosphoric acid solution. The acetate layer was removed and the aqueous layer extracted twice with 50 cc. of ethyl acetate each time. The ethyl acetate solutions, amounting to about 150 cc. were dried with sodium sulphate. The acidity was then adjusted to pH 5.5 with 0.5 normal sodium hydroxide solution and then with 0.1 normal potassium bicarbonate solution to pH 7.5. The aqueous solution, amounting to about 25 cc., was freeze-dried and yielded 2.2 grams of powder. This powder was dissolved in 8 cc. of water and 40 cc. of isopropanol were added. This caused the formation of long needle-like crystals which were removed by filtration, washed with isopropanol, ethyl acetate, and dried in air. The weight of the crystals was 0.77 grams. $[\alpha]_D^{20°}=+221°$ 0.3% in Sorensen's buffer. Melting point with decomposition was 243–245° C. (uncorr.). The infra-red spectrum for the product is shown in FIGURE 2.

EXAMPLE 3

*Preparation of 6-succinimidopenicillanic acid (potassium salt)*

1.08 grams of 6-aminopenicillanic acid were stirred with 6 cc. of water. We added slowly with stirring 15 cc. of 0.5 normal potassium bicarbonate solution. Then we added 0.9 gram of N-carboethoxysuccinimide, M.P. 51–53° C. The solution was diluted to 25 cc. with water and left for 2 hours at room temperature. A portion, 12 cc. was then freeze-dried and yielded 0.93 gram of product. Another portion of the solution, approximately 12 cc. was acidified to pH 2 with phosphoric acid, and extracted with ethyl acetate. The acetate solutions were dried with sodium sulphate, decanted and neutralized with 0.5 normal potassium bicarbonate solution. The aqueous layer was separated and freeze-dried to obtain our product, 6-succinimidopenicillanic acid (potassium salt).

EXAMPLE 4

*Preparation of 6-diphenimidopenicillanic acid (potassium salt)*

We proceeded as in Example 3 to make 6-diphenimidopenicillanic acid starting with 6-aminopenicillanic acid and N-carboethoxydiphenimide producing 6-diphenimidopenicillanic acid (potassium salt).

EXAMPLE 5

*Preparation of 6-benzoic sulphonimido-pencillanic acid (potassium salt)*

0.43 g. of 6-aminopenicillanic acid and 0.4 g. of potassium bicarbonate were dissolved in 12 cc. of water. To this solution were added 5 cc. of acetone and 0.51 g. of N-carboethoxysaccharin. The mixture was stirred for about 45 minutes at room temperature, diluted with water, and filtered to remove insoluble components. Amyl acetate was added to the aqueous layer and the mixture was adjusted to pH 2 with phosphoric acid under vigorous stirring. The amyl acetate layer was separated and extracted with 0.1 normal potassium bicarbonate solution to give an aqueous phase at pH 7.2. The aqueous phase was separated and freeze-dried yielding 0.6 g. of the new antibiotic.

It is to be noted that some of the N-carboalkoxyimides which we have used in the preparation of the products of our invention have not been previously described. Our process for the preparation of these products can be illustrated by the preparation of N-carboethoxydiphenimide as follows:

11 grams of diphenimide were dissolved in 175 cc. of warm tetrahydrofuran. The solution was stirred while cooling to room temperature. Then we added 7 cc. of triethylamine and dropwise 5 cc. of ethylchloroformate which we diluted with 5 cc. of tetrahydrofuran. Stirring was continued for 45 minutes. The mixture was filtered to remove triethylamine hydrochloride. The filtrate was concentrated in vacuo yielding an oily residue which was dissolved in 150 cc. of diethyl ether. The solution was concentrated until crystals formed. These were removed by filtration and air dried. Weight 7.5 g. M.P. 84–85° C.

Other imides, including N-carboethyoxysuccinimide, N-carboethoxy-3-nitrophthalimide and N-carboethoxy-4-nitrophthalimide, were prepared in a similar way and used in the preparation of our new compounds. An example of one of these is as follows:

EXAMPLE 6

*6 (4-nitrophthalimido) penicillanic acid (sodium salt)*

To a suspension of 3.24 g. of 6-aminopencillanic acid in water were added 14.3 ml. of N sodium hydroxide solution to pH 7.0. To the clear solution were added 25 g. of disodium phosphate dodecahydrate and 4.2 g. of 4-nitrocarboethoxy-phthalimide, M.P. 122.5–123.0 during one hour. After two hours the yellowish solution was filtered to remove undissolved material. The solution was covered with 150 ml. of methylamyl acetate, stirred, and acidified to pH 2.4 with 10% phosphoric acid. The methylamyl acetate layer was separated and the aqueous solution was extracted three times, each time with 100 ml. of methylamyl acetate. The total methylamyl acetate extracts, 450 ml. were dried with sodium sulphate, filtered and neutralized with normal sodium bicarbonate to pH 6.8. The aqueous solution was separated and freeze-dried, yield 5.9 g. The dry substance was dissolved in 50 ml. water, stirred and 106 ml. of isopropanol were added until the solution became turbid and needle-like crystals appeared. These were removed by filtration, washed with isopropanol and air-dried.

$$[\alpha]_D^{20°} = +227°$$

Further within the scope of our invention is the production of new derivatives of 6-aminopenicillanic acid prepared by the reduction of the nitro compounds for instance those of Examples 2 and 6 to produce the corresponding amino compounds.

While we have given specific examples of our new antibiotic substances comprising 6-imidopenicillanates and methods of preparing same it will be understood that other such substances may likewise be prepared in accordance with our invention.

What we claim is:

1. The alkali metal salts of a member selected from the group of 6-diphenimidopenicillanic acid and 6-benzoic sulphonimidopenicillanic acid wherein the alkali metal is sodium or potassium.

2. The potassium salt of 6-diphenimidopenicillanic acid.

3. The potassium salt of 6-benzoic sulphonimidopenicillanic acid.

References Cited by the Examiner

UNITED STATES PATENTS

| | | | |
|---|---|---|---|
| 2,721,196 | 10/55 | Sheehan | 260—239.1 |
| 2,934,540 | 4/60 | Sheehan | 260—239.1 |
| 2,941,995 | 6/60 | Doyle et al. | 260—239.1 |
| 2,951,839 | 9/60 | Doyle et al. | 260—239.1 |
| 3,117,126 | 1/64 | Hoover et al. | 260—243 |

OTHER REFERENCES

Antibiotics, Their Chemistry and Non-Medical Uses, published by D. Van Nostrand Co., Inc., New York, N.Y., pp. 59–66, 1959.

Nefkens, G. H. L.: Nature, vol. 185, p. 309, January, 1960.

Nefkens et al.: Recuoil des Tranaux Chimiqun des Pays-Bas, vol. 79, No. 7, pp. 688–698, July 1960.

IRVING MARCUS, *Primary Examiner.*